Feb. 23, 1960     A. J. AVETTA     2,925,771
BROILERS
Filed July 30, 1958     2 Sheets-Sheet 1
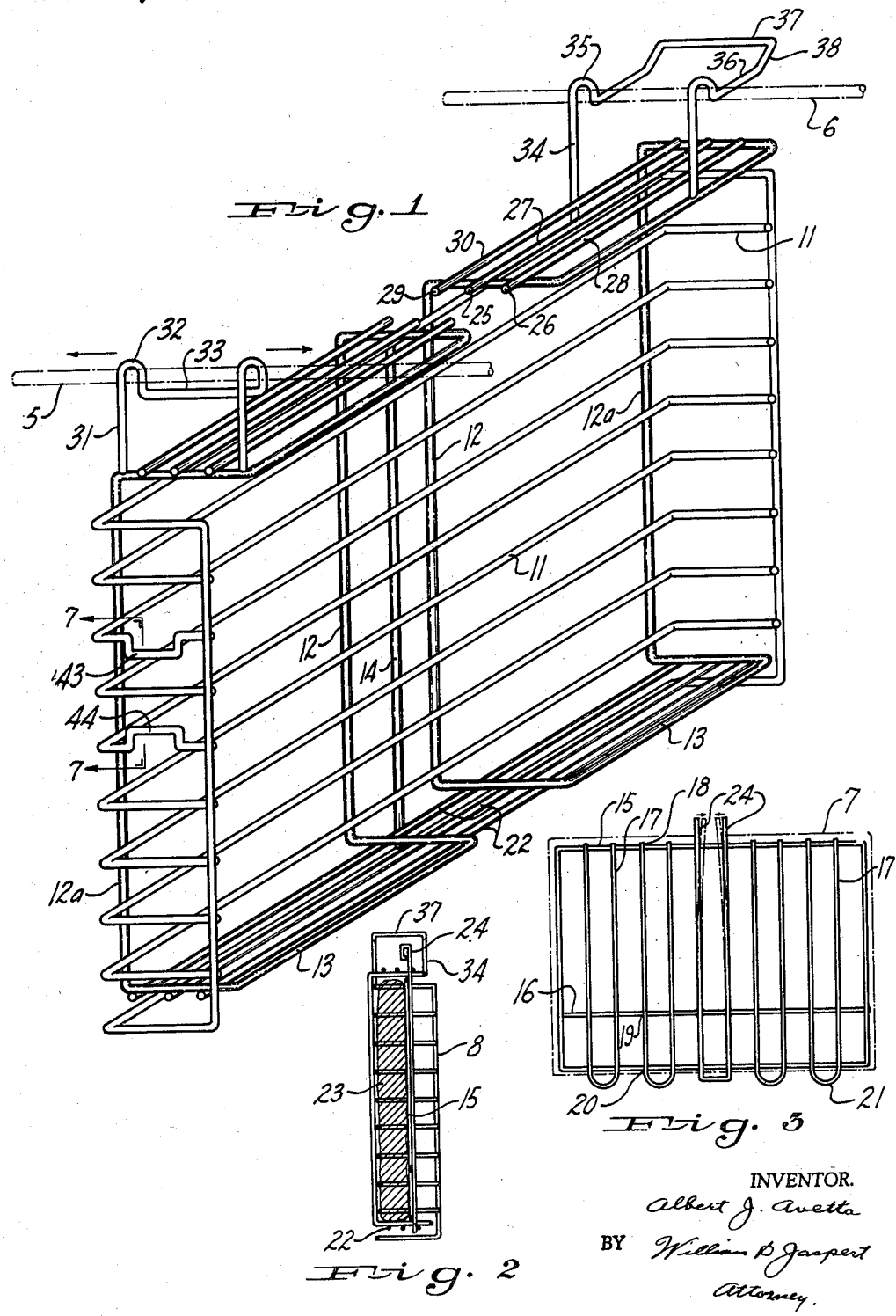
INVENTOR.
Albert J. Avetta
BY William B Jaspert
Attorney

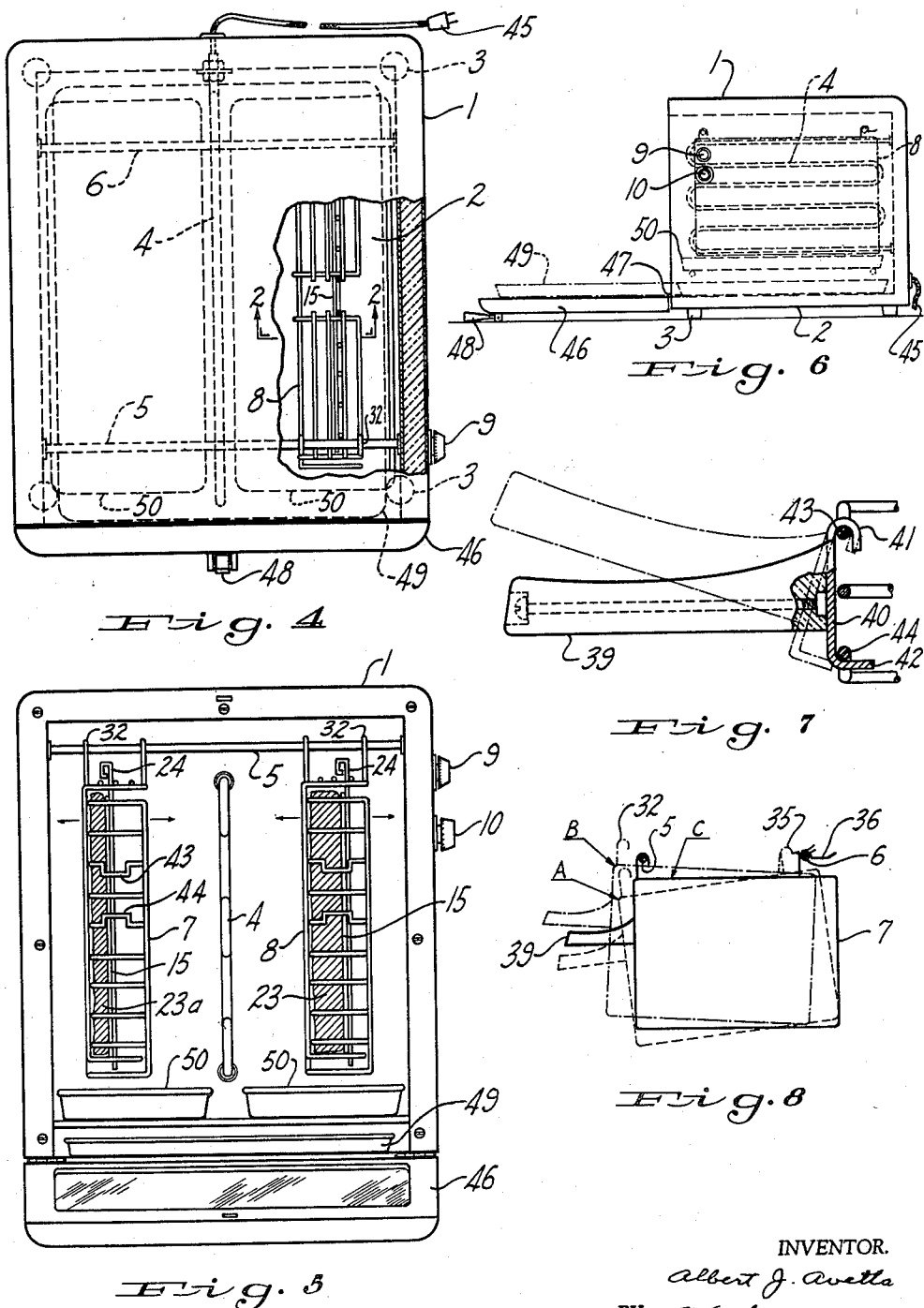

United States Patent Office 2,925,771
Patented Feb. 23, 1960

2,925,771

BROILERS

Albert J. Avetta, Pittsburgh, Pa.

Application July 30, 1958, Serial No. 752,068

5 Claims. (Cl. 99—393)

This invention relates to new and useful improvements in broilers, more particularly to broiler units which may be employed separately or as part of an oven for indoor cooking with either electrical heating elements or gaseous fuel.

It is among the objects of the invention to provide a broiler unit in which a heating element is disposed and in which one or more grills are suspended in a manner to be adjustable toward and away from the heat source.

It is a further object of the invention to provide a broiler unit of the above-designated character in which the grills are adapted to be snapped in position for suspension in the broiler housing while permitting sliding movement of the grill on its support.

It is still another object of the invention to provide a broiler unit of the above-designated character having a removable handle for attachment to off-set portions of the grill.

These and other objects of the invention will become apparent from a consideration of the accompanying drawings constituting a part hereof in which like reference characters designate like parts and in which:

Figure 1 is an isometric view of a broiler grill embodying the principles of this invention;

Figure 2, a cross section, partially in elevation, taken along the line 2—2 of Figure 4;

Figure 3 is a top plan view of a broiler grill.

Figure 4 is a bottom plan view of the broiler unit with the bottom of the housing partially cut away;

Figure 5 is a front elevation of the broiler unit with the hinged door dropped to open position;

Figure 6, a side elevational view of the unit with the door in open position;

Figure 7, a side elevation, partially in cross-section, of a grip or handle member adapted to interlock with portions of the broiler grill; and, Figure 8, a schematic view in side elevation showing the mounting of the broiler grills by snap action.

With reference to the several figures of the drawing, the numeral 1 generally designates a broiler unit in the shape of a rectangular oven housing having a bottom 2 supported on feet 3, Figure 6, the heating unit being an electrical element shown by the dotted lines 4, Figures 4 and 5, in the shape of a loop extending transversely through the center of the broiler housing. A pair of rods 5 and 6 extend transversely of the electrical element 4, as shown in Figures 4 and 5, the rods 5 and 6 constituting the supports for the broiler grills generally designated by the numerals 7 and 8, Figure 5. The electrical heating element 4 may be regulated by a thermostat control dial 9, Figure 5, and the cooking time can be controlled by a timer that can be set and regulated by the control knob 10 on the side of the broiler housing. The construction of and the manner of mounting the grills in the broiler units is more clearly shown in Figure 1 of the drawing in which the grills 7 and 8 are basket-like structures having a series of longitudinal wires 11 and cross wires 12 with their ends upturned to form the sides of the basket grill. The cross wires 12 are looped at 13 and return near the ends of the longitudinal wires 11, as shown at 12a. A central reinforcing wire 14 is disposed midway between the strands 12, as shown in Figure 1. The complementary portion for holding the food in the basket grill is shown in Figure 3 and consists of a flat wire frame 15 with a spaced longitudinal strand 16 and a plurality of looped strands 17 welded at 18, 19 and 20 to the frame 15 and strand 16. The looped ends 21 can be disposed between the longitudinal wires 22, Figure 1 to accommodate the holding frame of Figure 3 to the particular thickness of the food such as steak that is placed in the grill, the steak being illustrated by the cross-sectioned body at 23, Figure 2 of the drawing. As shown at the top of Figure 1, the center strands 24 of the structure of Figure 3 extending beyond the rectangular strand 15 fit between the ends 25 and 26 of the strands 27 and 28 respectively. Also, the strands 24 may be fitted between the end of the strand 27 and the end 29 of the bottom strand 30. By squeezing the two loose strands 24 together, as shown in the dotted line construction of Figure 3, they can be inserted between any of the ends of the strands 27, 28 and 30 and when released will snap into position between the open ends 25, 26 and 29 of the strands.

Further, as shown in Figure 1 and as digrammatically illustrated in Figure 8, a suspension member consisting of uprights 31 having loops 32 and a cross strand 33 is provided at one end of the basket grill and a similar member having uprights 34 with loops 35 and an extension portion 36 with a cross piece 37 and flared upwardly, as shown at 38, is provided at the other end of the basket grill. By means of these clips or suspension members the grill is mounted on the cross bars 5 and 6. By placing the loops 32 of the rear clip 31 on the cross wire 5, the front clip with the extension 36 come to rest on the cross member 6 and is pushed forward until it snaps into loops 35. When looped over the bars 5 and 6, the grills may be slid toward and away from the heating element 4.

For the purpose of handling the basket grill and placing it in suspended position in the grill unit, a handle 39, Figure 7, is provided. The handle has a plate 40 with a loop 41 and an L flange 42. By placing the loop 41 over the strand 43 and inserting the flange 42 in the offset strand 44, Figures 1 and 7, the basket grill is firmly held and may be removed from the cross supports 5 and 6 in the manner shown in Figure 8.

An electrical cord 45 is provided for connecting the heating element 4 to an outlet receptacle and a front door 46 is hinged at 47 and may be dropped as shown in Figure 6. The door is provided with a grip or knob 48 and when the door 46 is in the lowered position, as shown in Figure 6, the large drip pan 49 can be pulled out to catch the drippings when the basket grills are removed for inspection or exchanged to expose the uncooked side of the food to the heat element 4. A partition supports a pair of small drip pans 50 below the grills as shown in Figure 5.

For broiling steaks, the basket grill 7 and 8 of Figure 1 is laid flat and the steaks 23 and 23a are placed thereon. The cover or holding portion of Figure 3 is then placed in the appropriate space between the strands 22 with the loops 21 extending therethrough and the loose ends of the strands 24 snapped in position between the strands 27, 28 and 30, depending on the thickness of the steak.

As shown in Figure 5, the grill on the righthand side as viewed from the bottom, holds a relatively thick steak, whereas the one on the lefthand side shows a thin steak, the holders 15 being appropriately adjusted to the thickness of the steaks, as shown. When the meat is thus clamped between the grid elements, the handle 39 is placed on the offset cross strands 43 and 44, Figure 1, in the manner shown in Figure 7, and the grids are lifted into the broiler housing. The loop 32 of the basket grill is placed on the cross member 5 with the extension 36 of the front mounting clip resting on the cross member 6 and pushed forward until loops 35 snap over bar 6. The grids are adjusted with reference to the electrical element 4 by varying the distance in accordance with the heat intensity desired to act upon the meat. When one side has been done, the grills are interchanged so that opposite sides of the foods being broiled will be exposed to the electrical element 4.

It is evident, of course, that instead of the electrical element 4 a gas element may be substituted therefor. As shown in Figure 5, the door or cover 46 is provided with a glass so that the broiling of the food in the broiler unit can be observed without opening the door.

It is evident from the foregoing description that broiler units made in accordance therewith are compact and of a large capacity with a minimum area of electrical or gas heating media. It is further evident that since the food such as steak, sausage or other meats are vertically disposed, the drippings will not contact the element and no sooty flame will result. Also, by interchanging the broiler elements and by adjusting their position to the heat element, the cooking of the meat can be readily controlled.

It is further evident that a single broiler basket may be employed and placed first on one side of the heating element and then on the other, or it may have clips 32 and 35 on opposite sides and simply turned to expose both sides for cooking.

Although one embodiment of the invention has been herein illustrated and described, it will be evident to those skilled in the art that various modifications may be made in the details of construction without departing from the principles herein set forth.

I claim:

1. A broiler unit comprising an oven compartment having a doubled wall bottom and a hinged door and having a heating element disposed across a vertical section thereof, a pair of cross bars mounted transversely of said heating element for supporting grills, drip pans resting on the upper bottom wall below the grills and a drip pan disposed in the space between said doubled walls, said latter pan being withdrawn to rest on the door when the latter is lowered, and a basket grill having mounting clips resting on the cross bars to support their grilling faces vertically and parallel with the heating element.

2. A broiler unit comprising an oven compartment having a doubled wall bottom and a hinged door and having a heating element disposed across a vertical section thereof, a pair of cross bars mounted transversely of said heating element for supporting grills, drip pans resting on the upper bottom wall below the grills and a drip pan disposed in the space between said doubled walls, said latter pan being withdrawn to rest on the door when the latter is lowered, and a basket grill having mounting clips for sliding movement on the cross bars, said clips being attached on the top side of the grill to suspend its large grilling area in parallel relation with said heating element.

3. A broiler unit comprising an oven compartment having a doubled wall bottom and a hinged door and having a heating element disposed across a vertical section thereof, a pair of cross bars mounted transversely of said heating element for supporting grills, drip pans resting on the upper bottom wall below the grills and a drip pan disposed in the space between said doubled walls, said latter pan being withdrawn to rest on the door when the latter is lowered, and a basket grill having mounting clips resting on the cross bars to support their grilling faces vertically and parallel with the heating element, said clips extending above the top side of the grill and having loops with an extension for resting on and engaging the supporting cross bars.

4. A broiler unit comprising an oven compartment having a doubled wall bottom and a hinged door and having a heating element disposed across a vertical section thereof, a pair of cross bars mounted transversely of said heating element for supporting grills, drip pans resting on the upper bottom wall below the grills and a drip pan disposed in the space between said doubled walls, said latter pan being withdrawn to rest on the door when the latter is lowered, and a basket grill having mounting clips resting on the cross bars to support their grilling faces vertically and parallel with the heating element, said basket grill having off-set cross wires at the front side thereof for engaging and interlocking with the looped and flanged end of a removable handle.

5. A broiler unit comprising an oven compartment having a doubled wall bottom and a hinged door and having a heating element disposed across a vertical section thereof, a pair of cross bars mounted transversely of said heating element for supporting grills, drip pans resting on the upper bottom wall below the grills and a drip pan disposed in the space between said doubled walls, said latter pan being withdrawn to rest on the door when the latter is lowered, and a basket grill having mounting clips resting on the cross bars to support their grilling faces vertically and parallel with the heating element, said grill having longitudinally disposed wires and cross wires forming a basket and having a flat holding member with looped projections for insertion between the longitudinal wires on the bottom side of the grill, the holding member having a pair of projecting wire strands and said basket portion having its longitudinal wires on the top side terminating adjacent the center of the grill for receiving said projecting wire srands to interlock therewith.

References Cited in the file of this patent
UNITED STATES PATENTS

| | | |
|---|---|---|
| 457,316 | Gibbons | Aug. 4, 1891 |
| 713,635 | Harris | Nov. 18, 1902 |
| 1,034,393 | Millar | July 30, 1912 |
| 1,656,181 | Elbert | Jan. 17, 1928 |
| 1,865,354 | Brunner | June 28, 1932 |
| 2,168,390 | Bemis | Aug. 8, 1939 |
| 2,774,345 | Peplin | Dec. 18, 1956 |
| 2,851,575 | Walston et al. | Sept. 9, 1958 |